United States Patent
Ko

(10) Patent No.: US 9,948,459 B2
(45) Date of Patent: Apr. 17, 2018

(54) MULTIPLE ENCRYPTING METHOD AND SYSTEM FOR ENCRYPTING A FILE AND/OR A PROTOCOL

(71) Applicant: Cheng-Han Ko, New Taipei (TW)

(72) Inventor: Cheng-Han Ko, New Taipei (TW)

( * ) Notice: Subject to any disclaimer, the term of this patent is extended or adjusted under 35 U.S.C. 154(b) by 837 days.

(21) Appl. No.: 14/341,071

(22) Filed: Jul. 25, 2014

(65) Prior Publication Data
US 2016/0028540 A1 Jan. 28, 2016

(51) Int. Cl.
G06F 21/00 (2013.01)
H04L 9/08 (2006.01)
G06F 21/60 (2013.01)
G06F 21/62 (2013.01)

(52) U.S. Cl.
CPC .......... *H04L 9/0838* (2013.01); *G06F 21/602* (2013.01); *G06F 21/6209* (2013.01); *H04L 2209/24* (2013.01)

(58) Field of Classification Search
CPC ............................. H04L 9/0838; G06F 21/602
USPC ........................................................ 713/189
See application file for complete search history.

(56) References Cited

U.S. PATENT DOCUMENTS

| | | | | |
|---|---|---|---|---|
| 2007/0081670 A1* | 4/2007 | Topham | ............... | H04L 9/0637 380/239 |
| 2008/0095360 A1* | 4/2008 | Vuillaume | ............ | H04L 9/0863 380/44 |
| 2009/0147950 A1* | 6/2009 | Yoon | ..................... | H04L 9/0618 380/44 |
| 2009/0234751 A1* | 9/2009 | Chan | .................... | G06Q 20/145 705/26.1 |
| 2009/0315670 A1* | 12/2009 | Naressi | .................. | G06F 21/10 340/5.8 |

\* cited by examiner

*Primary Examiner* — Anthony Brown
(74) *Attorney, Agent, or Firm* — Muncy, Geissler, Olds & Lowe, P.C.

(57) ABSTRACT

The present invention relates to a multiple encrypting method, for encrypting a file and/or a protocol and generating encryption keys. Comprising the steps of: uploading at least one of a file and a protocol by a file uploading unit; generating random numbers by a random number generation unit; arranging the random numbers to form at least one key and at least one initialization vector respectively by a key generation unit and an initialization vector generation unit; encrypting the file and/or the protocol from the file uploading unit via using AES encryption by an encryption unit, so as to generate an encrypted file and/or an encrypted protocol; saving the key and the initialization vector respectively in a first storage unit and a second storage unit; Repeating the above steps at least one time.

8 Claims, 3 Drawing Sheets

MULTIPLE ENCRYPTING METHOD AND SYSTEM FOR ENCRYPTING A FILE AND/OR A PROTOCOL

FIELD OF THE INVENTION

The present invention relates to a multiple encryption method and system for encrypting a file and a protocol, more particularly, which allows users to upload files and protocol with more confidentiality, and allows to allocate system hardware resources efficiently. The file and the protocol are encrypted at least one time with method corresponding to AES (Advanced Encryption Standard), and the key and the initialization vector generated from the round are saved respectively in different locations. Moreover, the random numbers are arranged into the key and the initialization vector after the random numbers are generated, thereby increasing the complexity of key and initialization vector.

BACKGROUND OF THE INVENTION

There are many problems of being interfered by external signal, sabotaging, monitoring, network attacking in the software and hardware level among the smart mobile devices (such as the operating system of the smart phones and smart tablet), private cloud, public cloud and hybrid cloud of cloud systems, GPS, mobile baseband OS system, OS system of SIM card, RFID, wireless sensor network, wired router and wireless router, software-defined network (SDN), system on chip (SoC), enterprise digital rights management, video compression, power line network transmission, VoIP; other personal information privacy leaking including call logs, message logging, downloading data, photo, video, positioning information and financial security and network traffic. Therefore, governmental, banking, national defense, enterprise, organizational and medical institutions around the world, even individuals, will use encryption technology such as the Advanced Encryption Standard (AES), so as to encrypt transferring, processing and storage of confidential information.

Advanced Encryption Standard is one of the symmetric key encryption method and a block key encryption standard adopted by the U.S. federal government after the consideration of safety, cost and features of algorithms implementing such as actual security, randomness, robustness, authorization requirement, computing efficiency, memory requirement, algorithms arrangement, software/hardware applicability and simplicity. Moreover, AES encryption can be efficiently operated in the 32, 64-bit CPU. Therefore, AES was announced by the NIST as U.S. FIPS PUB 197 on Nov. 26, 2001 and became effective as a federal government standard on May 26, 2002. The Advanced Encryption Standard encryption has become one of the popular algorithms nowadays. However, AES encryption process could generate only one key, and cipher text corresponding to the key may be cracked by someone once the key is lost.

Another algorithm commonly used today is public key encryption method, which provides two keys, that is, a public key and a private key. All users know the public key for encrypting message or verifying digital signature. Private key is owned by specific user for decrypting the message and signing (or generating) a signature. Since public key and private key are asymmetric keys, encryption or signature verification party cannot decrypt or generate signatures. It is also called asymmetric encryption method. However, due to the performance of the encryption, decryption and transferring of the public key and the private key, speed of the public key encryption method is slower than that of AES encryption method. Moreover, the public key encryption method cannot encrypt a lot of files and the protocol in a short time due to limitations of hardware condition nowadays. However, the algorithm of asymmetric keys relies on random number generator for very quality random number such as nondeterministic true random number. Our invention can solve this problem in the form of software way with internet signal source (quantum signal source), digital signal source or analog signal source.

Due to globalization, information flow becomes more collaborative, refinement, service-based and intelligent. As a result, the information is everywhere and everyone can share information in this high speed and multi-tasking digital time, so as to generate the information security problems in some issues such as malicious intrusion, virus infection, authority control, encryption and decryption of BYOD (bring your own device), private cloud and public cloud. These would be the most important issues for information security now and future. Therefore, the present invention will become an important part in information security defenses.

In view of this, the present invention provides a multiple encryption method and system for encrypting a lot of information and generating a plurality of keys and initialization vectors corresponding to the encrypted files and encrypted protocols. The keys and the initialization vectors are saved in different location respectively. Moreover, the present invention could overcome the current problems of optimizing between hardware speed and software scheduling in current encryption/decryption technology due to characteristics of AES encryption process having excellent optimizing feature for CPU scheduling. The present invention can be effectively applied in the field of information security. The method and system of the present invention use Advanced Encryption Standard (AES) key to encrypt each file and each protocol even in the condition when a user's password has been stolen and disclosed, or a server is hacked or its information is stolen by internal staff. Each file and protocol has specific multiple key protections and cannot be decrypted immediately. In the same way, the present invention can also be applied in the software and hardware level among the smart mobile devices (such as the operating system of the smart phones and smart tablet), private cloud, public cloud hybrid cloud of cloud systems, GPS, mobile baseband OS system, SIM card OS systems, RFID, wireless sensor network, wired router and wireless router, software-defined network (SDN), system on chip (SoC), enterprise digital rights management, video compression, transmission power line network, VoIP and perform multiple encryption and decryption process in them. Therefore, the method and system of the present invention can improve significantly the protection for patent, trade secret and the Confidentiality, Authenticity, Controllability, Availability, Integrity and Non-repudiation of information security for governmental, banking, national defense, enterprise, organizational and medical institutions.

SUMMARY OF THE INVENTION

The present invention is directed to solve the problems of information security issues such as key storing management, the insufficient randomness of random number and signal transmission management.

In order to solve above problems, the present invention provides a method for encrypting a file and a protocol and generating a plurality of encryption keys, comprising steps of:

A: uploading at least one of a file and a protocol by a file uploading unit;
B: generating random numbers by a random number generation unit;
C: arranging the random numbers to form at least one key and at least one initialization vector respectively by a key generation unit and an initialization vector generation unit;
D: encrypting the file and/or the protocol from the file uploading unit with the key and the initialization vector via using AES encryption by an encryption unit, so as to generate an encrypted file and/or an encrypted protocol;
E: saving the key and the initialization vector respectively in a first storage unit and a second storage unit; and
F: Repeating the step B to D at least one time, so as to proceed at least one additional encryption and generate at least one additional key and at least one additional initialization vector.

The present invention also provides a multiple encrypting system for encrypting a file and/or a protocol and generating encryption keys, comprising:
a file uploading unit, for uploading at least one of a file and/or a protocol;
a random number generation unit, for generating random numbers;
a key generation unit, for arranging the random numbers to form a key;
an initialization vector generation unit, for arranging the random numbers to form an initialization vector;
an encryption unit, for encrypting the file and/or the protocol from the file uploading unit vector with the key and the initialization vector via AES encryption, so as to generate an encrypted file and/or an encrypted protocol; and
a first storage unit and a second storage unit for saving at least one key and at least one initialization vector respectively.

In implementation, in the above method and system, each random number is from an analog signal source, a digital signal source or an internet signal source.

In implementation, in the above method and system, wherein at least one of the random number generation unit, the key generation unit, the initialization vector generation unit, the first storage unit, the second storage unit and the encryption unit is a virtual machine or integrated circuit.

In implementation, in the above method and system, the encryption uses at least one of the methods including ECB (key length: 128, 192, 256), CBC (key length: 128, 192, 256), CTR (key length: 128, 192, 256), CCM (key length: 128, 192, 256), OFB (key length: 128, 192, 256), GCM (key length: 128, 192, 256), CFB 1 (key length: 128, 192, 256), CFB 8 (key length: 128, 192, 256) and CFB 128 (key length: 128, 192, 256).

In implementation, in the above method, wherein step D further comprising steps of:
D1: dividing each key and each initialization vector into sub-keys and sub-initialization vectors respectively by a dividing unit; and
D2: saving the sub-keys and the sub-initialization vectors respectively in the first storage unit and the second storage unit.

In implementation, in the above system, wherein the first storage unit and the second storage unit respectively include sub-units; the sub-keys and the sub-initialization vectors are respectively saved in the sub-units of the first storage unit and the second storage unit.

Embodiments of the present invention will be described by way of exemplary embodiments, but not limitations, illustrated in the accompanying drawings in which like references denote similar elements.

DETAILED DESCRIPTIONS OF PREFERRED EMBODIMENTS

Figure 1:
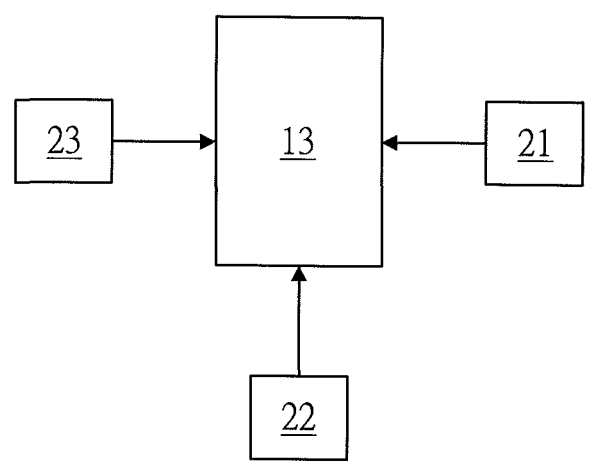
FIG. 1 is schematic view of an embodiment of the random number generation unit according to the present invention.
Figure 2:
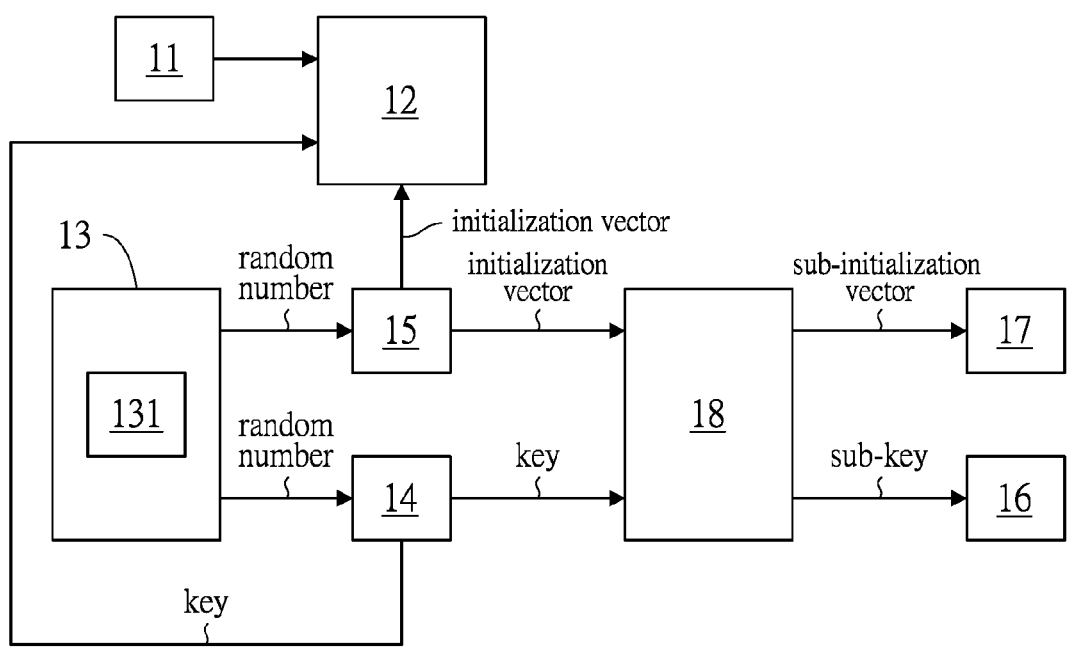
FIG. 2 is schematic view of the embodiment of the encryption system according to the present invention.
Figure 3:
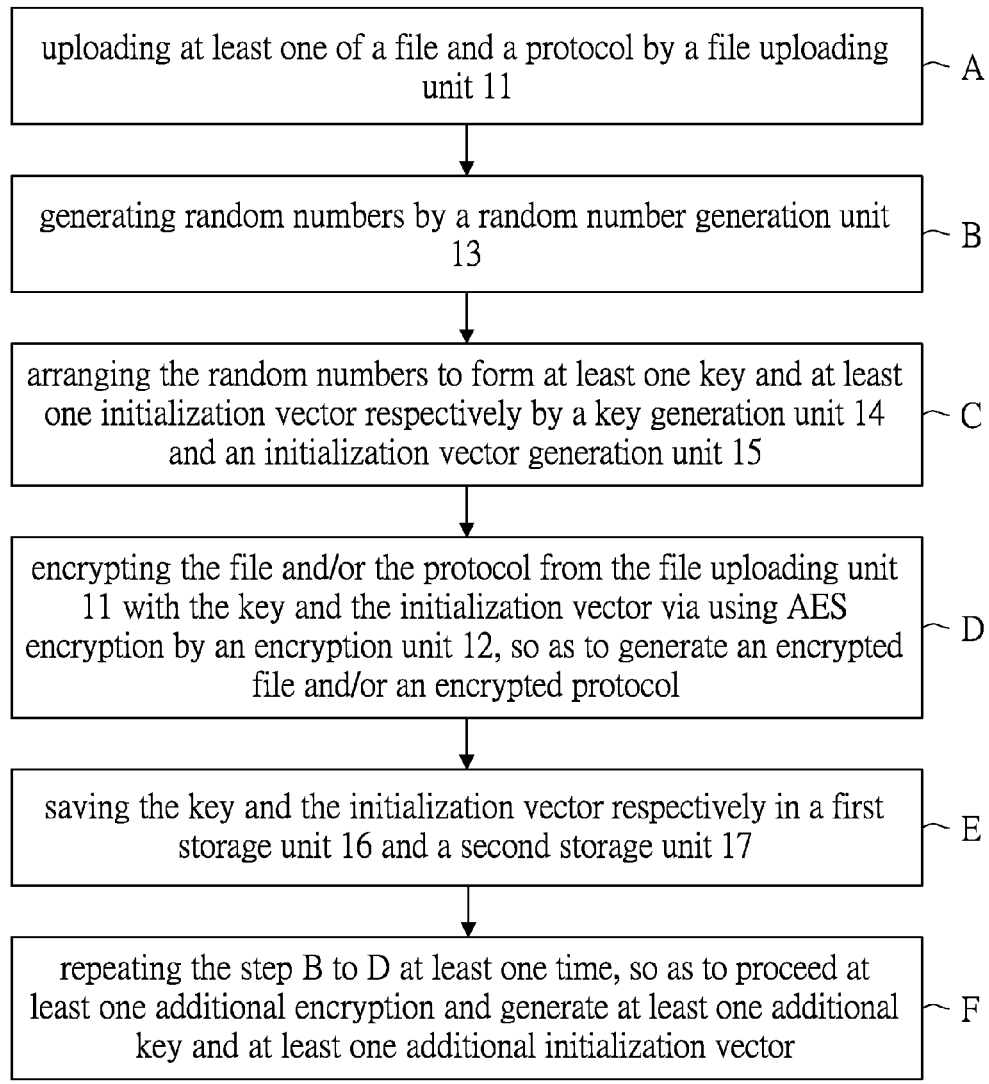
FIG. 3 and FIG. 3A are the diagram of multiple encrypting processes of the embodiment of the method according to the present invention.
Figure 3A:
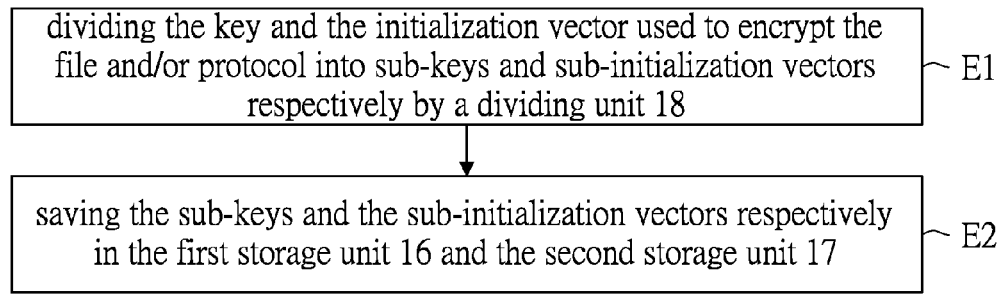

Referring to FIG. 1, the present invention discloses a multiple encrypting system. The system provides a file uploading unit 11, an encryption unit 12, a random number generation unit 13, a key generation unit 14, an initialization vector generation unit 15, a first storage unit 16, a second storage unit 17 and a dividing unit 18. The file uploading unit 11 is connected with the encryption unit 12; the random number generation unit 13 is connected with the key generation unit 14 and the initialization vector generation unit 15; the key generation unit 14 and the initialization vector generation unit 15 are both connected with the dividing unit 18 and the encryption unit 12; the dividing unit 18 is connected with the first storage unit 16 and the second storage unit 17. The random number generation unit 13 includes at least one random number generation sub-unit 131. The file uploading unit 11 could be a file uploading device for uploading file or protocol in general consumer electronics such as computers, smart phones, fax machines, scanners, camera equipments and video equipments, to the encryption unit 12. The encryption unit 12, the random number generation unit 13, the key generation unit 14, the initialization vector generation unit 15, the first storage unit 16 and the second storage unit 17, the dividing unit 18 could be personal devices such as computers, tablet computer and smart phones servers, or large device such as server, or reduced to a virtual machine or integrated circuit, for encrypting and calculating a lot of information when a lot of users are online.

The present invention discloses a multiple encrypting method, for encrypting a file and/or a protocol and generating encryption keys, comprising steps of:
A: uploading at least one of a file and a protocol by a file uploading unit;
B: generating random numbers by a random number generation unit;
C: arranging the random numbers to form at least one key and at least one initialization vector respectively by a key generation unit and an initialization vector generation unit;
D: encrypting the file and/or the protocol from the file uploading unit with the key and the initialization vector via using AES encryption by an encryption unit, so as to generate an encrypted file and/or an encrypted protocol;
E: saving the key and the initialization vector respectively in a first storage unit and a second storage unit; and
F: Repeating the step B to D at least one time, so as to proceed at least one additional encryption and generate at least one additional key and at least one additional initialization vector.

The method of the present invention will be described hereinafter: the step A in above method is to upload a file and/or a protocol from the file uploading unit 11 to the encryption unit 12. Before uploading the file and/or a protocol to the encryption unit 12, the system of the present invention can set a plurality of user data folders read in accordance with user's authority of the file and/or the protocol to prevent information from being stolen or read unintentionally. The format of the files could be various text file in Windows, IOS and Linux that can be read or use via the software like Notepad, Word, Powerpoint, Excel, iWork, Pages, Numbers, Keynote, Writer, Calc, Impress, Draw and Math; various image file such as BMP, GIF, JPEG, JPG, SVG, TIFF, TIF, PNG, YUV and EPS.

In step B, referring to FIG. 1, in one embodiment, each random number is generated from an analog signal source 21, a digital signal source 22 or an internet signal source 23. In one embodiment, the analog signal source 21, the digital signal source 22 and the internet signal source 23 are set to generate one random number respectively. Analog signal source 21, digital signal source 22 and the internet signal source 23 have respectively at least one signal input end, wherein analog signal source 21 may include analog signals produced from computer hardware such as radiator fan and the noise signal of circuit of the board; digital signal source 22 includes digital signals produced from at least one algorithm set by the administrator; the internet signal source 23 includes internet signals produced from the information in internet or internal server API (Application Programming Interface) such as online real time quantum random source (binary, hex, unit 8, unit 16). In quantum physics theory, any measurement will disturbs the data but the quantum random source can guarantee that the random number is only one number in same time and the same space. Therefore, the random number will be unique. If the random seed is unique, the random number will be non-deterministic random number. If the random seed is not unique, all random numbers can be easy reverse by sequencing or guessing in the future technologies. For example, quantum computing and cloud computing will also make sure that encrypted data and protocol are not able to be stolen and cracked by any machine, so as to ensure that signals can be processed continually without interruption when one or more than one of the analog signal source 21, digital signal source 22 and the internet signal source 23 is broken.

When random number generation unit 13 receives the signals from above three signal sources, where the analog signals are converted into digital signals by an analog/digital converter first, and then they will be converted in to random numbers by a random number function; the digital signal source 22 and the internet signal source 23 are converted into random numbers respectively by different random number functions, wherein the random number functions described above are complied with rule of the American National Standards Institute (ANSI). The random numbers from the analog signal source 21, the digital signal source 22 and the internet signal source 23 are combined to form a plurality of random numbers by random number generation unit 13. When the Internet or LAN network is interrupted, the above signal sources will be adjusted into three analog signals because the transmission of internet signal source and digital signal source via Internet or LAN network will not work. After the three analog signals are converted into three digital signals, the three digital signals are converted into random numbers respectively by different random number functions, so as to maintain the random number generation step.

In one embodiment, the signal source of the random number generation unit 13 can be consisted of the analog source 21, the digital signal source 22 or the internet signal source 23. For example, except for the group consisted of one analog source 21, one digital signal source 22 and one internet signal source 23, the group can be consisted of two analog signal sources and one digital signal source; two analog signal sources and one internet signal source; two digital signal sources and one analog signal source; two digital signal sources and one internet signal source; two internet signal sources and one analog signal source; two internet signal sources and one digital signal source; three analog signal sources; three digital signal sources; three internet signal sources. Therefore, the complexity of the random number combination is increased.

In one embodiment, the signals can be generated from the group consisted of any two of the analog source 21, the digital signal source 22 and the internet signal source 23. In one embodiment, the number of the signal input end of the analog source 21, the digital signal source 22 and the internet signal source 23 can be more than one respectively, together with the combinations having a lot of complexity described above, so as to enhance significantly the complexity of the random number generation process.

In one embodiment, the analog signal source 21, digital signal source 22 and the internet signal source 23 can be a virtual machine or Integrated circuit for performing the random number generation process, wherein the input signal end of the digital signal source 22 can be from another virtual machine or integrated circuit, which executes a plurality of algorithms.

In step C, the random number generation unit 13 provides a plurality of random numbers. In the random number generation unit 13, the resources of CPU are allocated to random number generator sub-units 131 that are independent of each other by using at least one virtual machine or integrated circuit provided with operating systems such as Linux. The random number generator sub-units 131 generate the random numbers respectively by using random number generation algorithms that are independent of each other and have different bits and rules. After generating the random numbers, the random numbers are arranged into a key and an initialization vector respectively by the key generation unit 14 and the initialization vector generation unit 15 according to the rules set by the administrator, wherein the rules for arranging the random numbers to form a key and an initialization vector are also different. The key size is limited to 128, 192, or 256 bit while the length of the initialization vector is the same as the plaintext. After that, the key and the initialization vector are transferred to the encryption unit 12 respectively.

In Step D, in the encryption unit 12, the file and/or the protocol from the file uploading unit is/are encrypted with the key and the initialization vector via using AES encryption such as cipher-block chaining model of AES encryption, wherein the AES encryption method also includes at least one of the ECB (key length: 128, 192, 256), CBC (key length: 128, 192, 256), CTR (key length: 128, 192, 256), CCM (key length: 128, 192, 256), OFB (key length: 128, 192, 256), GCM (key length: 128, 192, 256), CFB 1 (key length: 12, 192, 256), CFB 8 (key length: 128, 192, 256), CFB 128 (key length: 128, 19, 256), RC4 128-bit, RC4 40-bit, DES, TDES and Threefish. After each bit of the first plaintext block (J1) is combined with the initialization vector generated via above steps by using XOR operation, the first plaintext block (J1) is applied with cipher block chaining model (CBC) with the key generated via above steps, so a first block cipher text (X1) is generated. The second block of plaintext (J2) must be combined with the first block of cipher text (X1) by using XOR operation first and is applied with the same encryption process, thereby generating a second block cipher text (X2). Namely, before the block is encrypted each round each block must be combined with a cipher text generated via last plaintext by using XOR operation and be encrypted. So the process is carried out orderly. Finally, cipher texts are chained together with each other, so as to generate an encrypted file and/or an encrypted protocol.

In step E1, dividing the key and the initialization vector used to encrypt the file and/or the protocol into sub-keys and sub-initialization vectors respectively by a dividing unit 18 according to the rules set by the administrator.

In step E2, saving the sub-keys and the sub-initialization vectors respectively in a first storage unit 16 and a second storage unit 17. In view of information security, the first storage unit 16 and the second storage unit 17 are set in different servers, but they are also can be set in the same server for the sake of convenience. The hard disk of the first storage unit 16 and the second storage unit 17 are also encrypted by one of the AES encryption methods including ECB (key length: 128, 192, 256), CBC (key length: 128, 192, 256), CTR (key length: 128, 192, 256), CCM (key length: 128, 192, 256), OFB (key length: 128, 192, 256), GCM (key length: 128, 192, 256), CFB 1 (key length: 12, 192, 256), CFB 8 (key length: 128, 192, 256), CFB 128 (key length: 128, 19, 256), RC4 128-bit, RC4 40-bit, DES, TDES and Threefish, which would enhance security of initialization vector storage and key storage. Moreover, the first storage unit 16 and the second storage unit 17 respectively include sub-units provided for saving the sub-keys and the sub-initialization vectors respectively. That is, the first storage unit 16 and the second storage unit 17 can also be a set formed by the sub-units, wherein the sub-unit can be a small server, a personal computer, private cloud or public cloud.

In step F, repeating the step B to D at least one time. The random number generation unit 13 generates the random number again, and then the random numbers are arranged into a key and a initialization vector respectively by the key generation unit 14 and the initialization vector generation unit 15 according to the rules set by the administrator, wherein the rules for arranging the random numbers into additional key and additional initialization vector in each round are also different. After that, provide the encrypted file and/or the encrypted protocol with one additional encryption corresponding to AES encryption including AES ECB (key length: 128, 192, 256), CBC (key length: 128, 192, 256), CTR (key length: 128, 192, 256), CCM (key length: 128, 192, 256), OFB (key length: 128, 192, 256), GCM (key length: 128, 192, 256), CFB 1 (key length: 12, 192, 256), CFB 8 (key length: 128, 192, 256), CFB 128 (key length: 128, 19, 256), RC4 128-bit, RC4 40-bit, DES, TDES and Threefish, so as to generate a second encrypted file and/or a second encrypted protocol. The second encrypted file and/or the second encrypted protocol are saved in the first storage unit 16 and the second storage unit 17. This step is an important technical feature of the present invention.

For the files and protocols encrypted twice generated by above method, their decryption process is described below: first, the sub-keys and the sub-initialization vectors of the second round are accessed from the first storage unit 16 and the second storage unit 17. The sub-keys and the sub-initialization vectors of the second round are recombined according to the rule of the second round set by administrator. During the decryption process, the first decrypted file is generated through series of inverse operation of the decryption process in Step C by the key generation unit 14 and the initialization vector generation unit 15 of the second round. And so on, the original plaintext is generated after the decryption process of the first round by the key generation unit 14 and the initialization vector generation unit 15 of the first round. Thus, if users need to read the files that are encrypted twice, the two keys and two initialization vectors generated respectively in the first and second round are required. Then the user can read the content of the files.

Therefore, Step E is important technical features of the present invention. In the case of advancement in hardware device nowadays, together with the highly optimized feature of 32 bit and 64 bit CPU for AES encryption process, the present invention can theoretically be repeated the Step B to D three times or even more than three times, so as to generate more additional keys and additional initialization vectors of another round and increase significantly the difficulty for decryption and enhance the security significantly.

Moreover, when the file uploading unit 11, the encryption unit 12, the random number generation unit 13, the key generation unit 14, the initialization vector generation unit 15, the first storage unit 16, the second storage unit 17 and the dividing unit 18 perform their functions, their process will all be recorded. Alternatively, in the above method and system, the connections between the file uploading unit 11, the encryption unit 12, the random number generation unit 13, the key generation unit 14, the initialization vector generation unit 15, the first storage unit 16, the second storage unit 17 and the dividing unit 18 are all provided with SSL (secure socket layer) encryption, and the communications protocol that meet the public and private key encryption standard.

The system and the method of the present invention can be applied in GPS (Global Positioning System). It significantly reduces loss of a lot of secret information or personal data for GPS due to external signal interference or destruction and network attack by encrypting transferring signals between space satellites unit, ground monitor unit and GPS receiver unit The system and the method of the present invention can be applied in communication systems nowadays. When calling on the cell phone, sending text messages or linking the wireless network, the signals via baseband OS and corresponding to GSM, UMTS and LTE protocol are encrypted with the multiple AES encryption of present invention. The present invention can also be applied in placement of integrated circuits of mobile phones by using device such as logic gates. In the same way, the signals of OS system of SIM card can be encrypted with the multiple AES encryption of present invention, or set logic gates on a SIM card with the multiple AES encryption of present invention. Therefore, the system and method of AES decryption of the present invention can be implanted to SIM card itself, so as to increase significantly the information security of mobile communication today.

The system and the method of the present invention can be applied in communication of long term evolution (4G LTE) corresponding to wireless data communication technology standard. LTE is a high-speed wireless communications standard and applied in terminal of smart phone and data card. The standard is based on network technologies such as GSM, EDGE, UMTS and HSPA and is provided with modulation techniques such as digital signal processing (DSP) technology, so as to improve significantly the network capacity and transferring speed. The system and method of multiple AES decryption of the present invention can be applied in LTE transmission signals, and the signals can be encrypted one or more than one time and classified according to the confidential level, so as to enhance significantly the communication security in future of 4G period.

Accordingly, the present invention has the following advantages:

1. The present invention takes the advantage of less hardware resource loss for AES encryption process. Therefore, the governmental, banking, national defense, enterprise, organizational and medical institutions can encrypt a lot of confidential information from past, now and future to a data storage system by using the multiple AES encryption of the present invention.
2. Each file and each protocol are encrypted in multiple rounds through multiple AES encryption of the present invention, and the keys corresponding to the encrypted files and the encrypted protocol are stored in different location. Even the information in one of the locations is leaked, the contents of the file and the protocol would not be stolen immediately, so as to enhance the information security of the file and the protocol. Therefore, the uploading file and the protocol of the present invention have defenses including AES-256 bit encryption and different location for saving the keys and the initialization vectors.
3. Each key and each initialization vector are divided into sub-keys and sub-initialization vectors respectively by the dividing unit. Even the storage locations are found and invaded by someone, the dividing rules of each key and each initialization vector cannot be found in a short time, so as to add additional defense.
4. The random numbers of the present invention are generated by at least one virtual machine or integrated circuit that executes different random number generation programs (or algorithms), in order to avoid using the same or a few programs (or algorithms) and increase significantly the irregularity of the random number. Moreover, the random numbers are arranged respectively by the key generation unit and the initialization vector generation unit according to different rules, so as to enhance complexity of the keys and initialization vectors.
5. The present invention has wide applications. In addition to the applications in governmental, banking, national defense, enterprise, organizational and medical institutions to enhance the information security protection, the present invention can be applied in other fields such as electronic communications, e-commerce, personal data security, and smart phone applications (app).
6. The random number (at least one random number) of the present invention is generated from an analog signal source, a digital signal source and an internet signal source. It able to make the random number generation be unrepeated and completely random by means of the change of the three kinds of signals.

The description referred to the drawings stated above is only for the preferred embodiments of the present invention. Many equivalent local variations and modifications can still be made by those skilled at the field related with the present invention and do not depart from the spirit of the present invention, and they should be regarded to fall into the scope defined by the appended claims.

As disclosed in the above description and attached drawings, the present invention can provide a multiple encrypting method and system for encrypting a file and/or a protocol. It is new and can be put into industrial use.

What is claimed is:

1. A multiple encrypting method, for encrypting a file and/or a protocol and generating encryption keys, performed by a processor being programmed to function as a file uploading unit, a random number generation unit, a key generation unit, an initialization vector generation unit, an encryption unit, and a dividing unit and comprising steps of:
    A: uploading at least one of a file and a protocol by the file uploading unit;
    B: generating random numbers by the random number generation unit;
    C: arranging the random numbers to form a plurality of keys and a plurality of initialization vectors that differ from each other respectively by the key generation unit and the initialization vector generation unit;
    D: encrypting the file and/or the protocol from the file uploading unit with one of the plurality of keys and one of the plurality of initialization vectors via using AES encryption by the encryption unit, so as to generate an encrypted file and/or an encrypted protocol;
    E1: dividing a key and an initialization vector used to encrypt the file and/or the protocol into sub-keys and sub-initialization vectors respectively by the dividing unit;
    E2: saving the sub-keys and the sub-initialization vectors respectively in a first storage unit and a second storage unit; and
    F: Repeating the step B to D at least one time, so as to proceed at least one additional encryption by using the key and the initialization vector that differ from the plurality of keys and plurality of initialization vectors generated in the step C and generate at least one additional key and at least one additional initialization vector.

2. The method as claimed in claim 1, wherein at least one of the random number generation unit, the key generation unit, the initialization vector generation unit, the first storage unit, the second storage unit and the encryption unit is a virtual machine or integrated circuit.

3. The method as claimed in claim 1, wherein the encryption in the step D uses at least one of the methods including ECB (key length: 128, 192, 256), CBC (key length: 128, 192, 256), CTR (key length: 128, 192, 256), CCM (key length: 128, 192, 256), OFB (key length: 128, 192, 256), GCM (key length: 128, 192, 256), CFB 1 (key length: 128, 192, 256), CFB 8 (key length: 128, 192, 256) and CFB 128 (key length: 128, 192, 256).

4. The method as claimed in claim 1, wherein in the step B, each random number is from an analog signal source, a digital signal source or an internet signal source.

5. A multiple encrypting system for encrypting a file and/or a protocol and generating encryption keys, comprising a processor being programmed to function as:
    a file uploading unit, for uploading at least one of a file and a protocol;
    a random number generation unit, for generating random numbers;
    a key generation unit, for arranging the random numbers to form a plurality of keys;
    an initialization vector generation unit, for arranging the random numbers to form a plurality of initialization vectors;
    an encryption unit, for encrypting the file and/or the protocol from the file uploading unit with one of the plurality of keys and one of the plurality of initialization vectors via AES encryption, so as to generate an encrypted file and/or an encrypted protocol;

a first storage unit and a second storage unit, for saving at least one key and at least one initialization vector respectively; and a dividing unit, for respectively dividing the key and the initialization vector used to encrypt the file and/or the protocol to form sub-keys and sub-initialization vectors, wherein the first storage unit and the second storage unit respectively include sub-units, and the sub-keys and the sub-initialization vectors are respectively saved in the sub-units of the first storage unit and the second storage unit.

6. The system as claimed in claim 5, wherein at least one of the random number generation unit, the key generation, the initialization vector generation unit, the first storage unit, the second storage unit and the encryption unit is a virtual machine or integrated circuit.

7. The system as claimed in claim 5, wherein the encryption unit uses at least one of the methods including ECB (key length: 128, 192, 256), CBC (key length: 128, 192, 256), CTR (key length: 128, 192, 256), CCM (key length: 128, 192, 256), OFB (key length: 128, 192, 256), GCM (key length: 128, 192, 256), CFB 1 (key length: 128, 192, 256), CFB 8 (key length: 128, 192, 256) and CFB 128 (key length: 128, 192, 256).

8. The system as claimed in claim 5, wherein each random number is from an analog signal source, a digital signal source or an internet signal source.

* * * * *